S. A. MISCHANSKY.
PHOTOGRAPHIC PLATE HOLDER.
APPLICATION FILED FEB. 25, 1915.
1,236,201.
Patented Aug. 7, 1917.
2 SHEETS—SHEET 1.
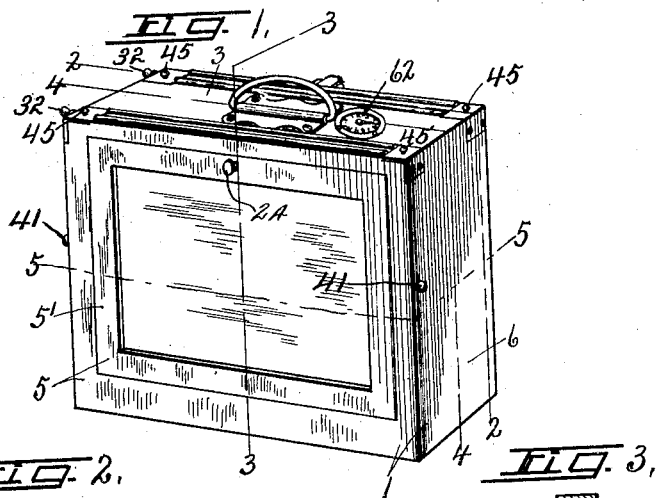
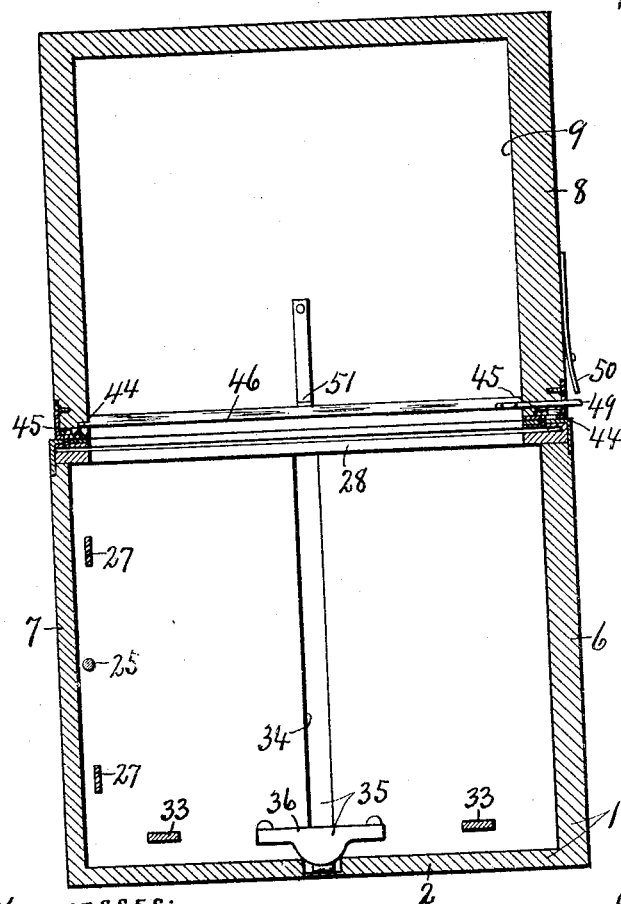
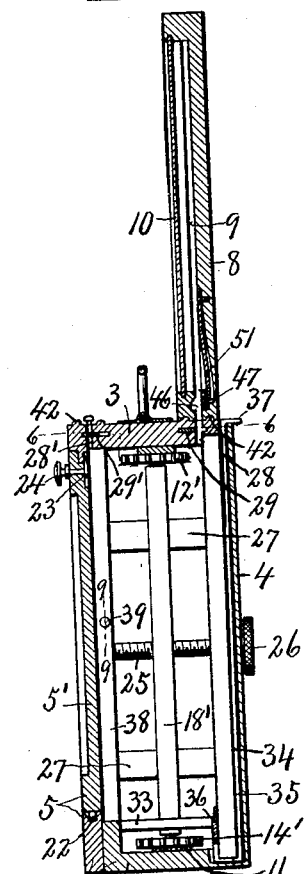
WITNESSES:
INVENTOR
S. A. Mischansky
BY Howard P. Denison
ATTORNEY.

S. A. MISCHANSKY.
PHOTOGRAPHIC PLATE HOLDER.
APPLICATION FILED FEB. 25, 1915.
1,236,201.
Patented Aug. 7, 1917.
2 SHEETS—SHEET 2.
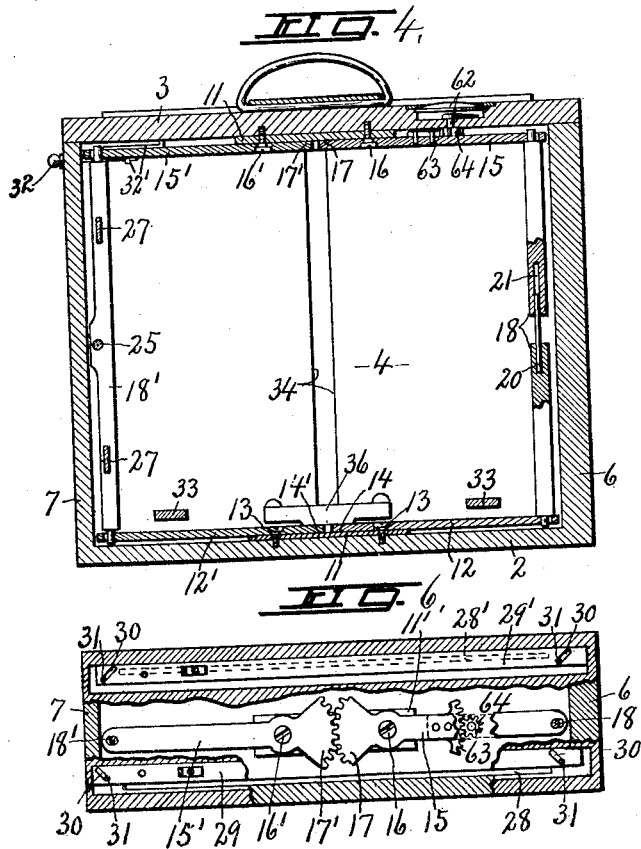
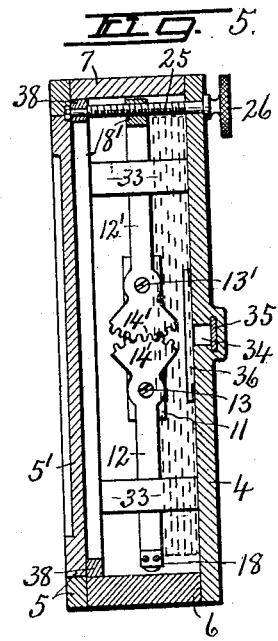
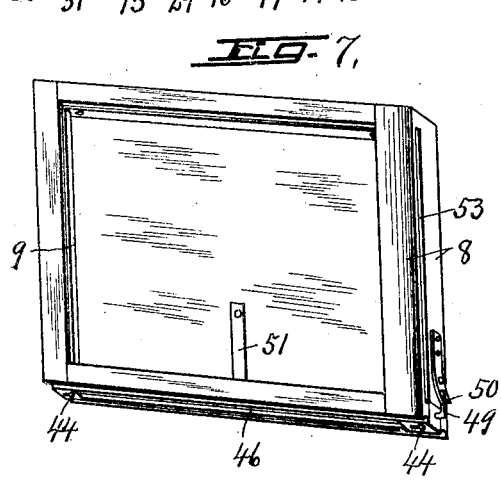
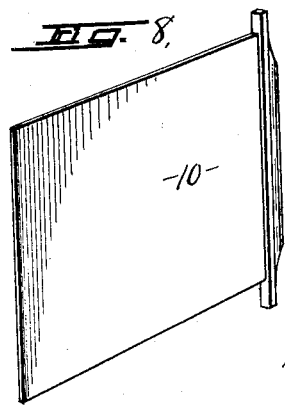
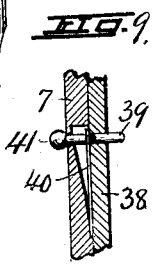
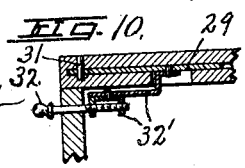
WITNESSES:
H. V. Hurst.
H. E. Chase
INVENTOR
S. A. Mischansky
BY Howard P. Denison
ATTORNEY.

UNITED STATES PATENT OFFICE.

STEPHEN A. MISCHANSKY, OF SYRACUSE, NEW YORK, ASSIGNOR OF FORTY ONE-HUNDREDTHS TO FRANCIS BUSIN, OF SYRACUSE, NEW YORK.

PHOTOGRAPHIC-PLATE HOLDER.

1,236,201.  Specification of Letters Patent.  Patented Aug. 7, 1917.

Application filed February 25, 1915. Serial No. 10,439.

*To all whom it may concern:*

Be it known that I, STEPHEN A. MISCHANSKY, a subject of the Emperor of Austria, and resident of Syracuse, in the county of Onondaga, in the State of New York, have invented new and useful Improvements in Photographic-Plate Holders, of which the following, taken in connection with the accompanying drawings, is a full, clear, and exact description.

This invention relates to certain improvements in photographic plate magazines adapted to be carried and used in connection with a camera for receiving the unexposed and exposed plates and to exclude light therefrom.

The ordinary plate-holder now in common use and adapted to be inserted in the camera contains two compartments separated by an opaque partition for receiving a corresponding number of photographic plates which are protected from the light by sliding shutters movable across said compartments at the outer sides of the plates so that if it is necessary to have at hand a considerable number, say twenty-four, of these plates, it is customary to carry twelve holders, each containing two plates, and if arranged in the most compact relation possible would produce a package of from ten to twelve inches in thickness with a corresponding increase in width.

One of the objects, therefore, of my present invention is to provide a magazine in which a relatively large number, say twenty-four, of these plates may be collated in such compact arrangement as to occupy approximately one-fourth of the space necessary under the present usage.

Another object is to provide simple means for transferring the plates from the magazine to the camera and vice versa without liability of exposure to light.

A further object is to provide means whereby the number of exposed or unexposed plates in the magazine may be accurately determined at any time without opening the magazine.

Other objects and uses will be brought out in the following description.

In the drawings—

Figure 1 is a perspective view of a photographic plate magazine embodying the various features of my invention.

Fig. 2 is an enlarged longitudinal vertical sectional view taken on line 2—2, Fig. 1.

Fig. 3 is an enlarged transverse vertical sectional view taken on line 3—3, Fig. 1.

Fig. 4 is an enlarged longitudinal vertical sectional view taken on line 4—4, Fig. 1.

Fig. 5 is a horizontal sectional view taken approximately on line 5—5, Fig. 1.

Fig. 6 is an inverted horizontal sectional view taken in approximately the plane of line 6—6, Fig. 3.

Fig. 7 is a perspective view of the individual plate-holder adapted to be used in the camera and also for transferring the individual plates from the camera to the magazine and vice versa.

Fig. 8 is a perspective view of the shutter for the plate-holder shown in Fig. 7.

Fig. 9 is a detail sectional view through a portion of one side of the magazine taken on line 9—9, Fig. 3, showing one of the movable guide pins for guiding the exposed plate into the magazine.

Fig. 10 is a detail sectional view through one end of one of the sliding shutters showing its operating means.

The magazine proper comprises a rectangular case —1— having a bottom —2—, top —3—, front and rear sides —4— and —5—, and ends —6— and —7—, said case being of sufficient size to receive a plurality of, in this instance twenty-four, photographic plates of the larger, 8″x10″, dimensions, and it is, therefore, evident that the exterior dimensions of the magazine need not be more than approximately 10″ high by 12″ long and between 3″ and 4″ deep from front to rear.

The case may be made of any light and comparatively inexpensive material, such as wood, so that when filled with photographic plates it may be easily carried from place to place with the camera.

Associated with the magazine is a specially constructed individual plate-holder —8— having one side closed and its other side provided with a recess —9— of sufficient size to receive one of the photographic plates, the recessed side being provided with a sliding shutter —10— guided in grooves in the lower and upper rails, as shown more clearly in Fig. 3, the object of the shutter being to exclude light from the plate while the holder —8— with the plate therein is being transferred from the camera to the magazine and vice versa, it being understood that the shutter —10— is withdrawn when the holder is placed in the camera preparatory to taking a picture.

The construction of this individual plate-holder and means for attaching it to the magazine will be hereinafter more fully described.

The bottom —2— of the magazine is provided on its upper face with a substantially flat metal bearing —11— suitably secured thereto for receiving and supporting a pair of levers —12— and —12'—, which are pivoted, respectively, at —13— and —13'— to said plate to rock horizontally in the same horizontal plane, and are provided on their adjacent ends with intermeshing gear segments —14— and —14'—, shown more clearly in Fig. 5.

A similar plate —11'— is secured to the under side of the top —3— of the magazine for receiving and supporting a pair of levers —15— and —15'— which are pivoted at —16— and —16'—, respectively, to said plate to rock horizontally and are provided on their adjacent ends with intermeshing gear segments —17— and —17'— to cause them to rock simultaneously in reverse directions in the same manner as the lower levers —12— and —12'—.

Both pairs of levers are of substantially the same construction and disposed in the same vertical plane with their outer ends extending to points in proximity to the ends —6— and —7— and apertured to receive suitable vertical partition bars —18— and —18'—, which are movable with the levers across and in close proximity to the inner faces of the ends of the magazine, as shown more clearly in Figs. 3, 4 and 5 for engaging the ends of the photographic plates and holding them in close relation against undue rattling or vibratory movement and also serve to separate the exposed plates from the unexposed plates in a manner hereinafter more fully described.

One of the upright bars, as —18—, is made in sections and connected so that one section may be slid endwise relatively to the other section, and for this purpose the adjacent ends of the sections are connected by a tie-piece —20— secured in a socket in the inner end of one section and having its opposite end slidable in a socket —21— in the other section, thus permitting the lower section to be moved upwardly out of interlocking engagement with its corresponding lower lever —12—, whereupon the entire bar may be withdrawn from the corresponding upper lever —15— and removed to permit the magazine to be filled with unexposed photographic plates.

In order that the work of filling the magazine may be expeditious, the rear side —5— thereof is provided with a door —5'— of sufficient size to allow the plates to pass through the door opening, said door having its lower edge provided with one or more pins or dowels —22— fitting in sockets in the lower rail of the rear side —5—, while the upper portion of the door is provided with a catch —23— adapted to be moved into and out of interlocking engagement with the upper rear rail by means of a knob or handle —24— connected to the catch and extending through the door to the outside thereof, as shown more clearly in Figs. 1 and 3.

One of the upright bars, as 18', may be adjusted backwardly and forwardly by means of a screw —25— which is journaled and held against endwise movement by suitable bearings in the front and rear sides of the case near one end, as —7—, and is provided with an external knob or hand-piece —26— by which it may be rotated, the intermediate portion of the screw being engaged in a threaded aperture in the central portion of said bar, as shown more clearly in Fig. 5, similar motion in the same direction being transmitted to the other bar —18— through the medium of the levers —12— and —12'— and —15— and —15'—, said bar —18'— being guided in its backward and forward movement on transverse ways —27—, as shown more clearly in Figs. 3 and 4.

The top of the case is provided near the front and rear sides thereof with vertical slots or openings —28— and —28'— communicating with the interior of the case at opposite sides of the upright follower bars —18— and —18'— and of sufficient length and width to receive the photographic plates, said slots being provided with shutters —29— and —29'— consisting of flat metal strips running the entire length of the slots or openings and movable horizontally across the openings in suitable guides or recesses at opposite sides of said openings, as shown more clearly in Figs. 3 and 6.

These shutters are normally closed to exclude light from the photographic plates within the case and are opened only when a plate is being withdrawn through the opening —28— or inserted into the case through the opening —28'—.

*Operating means.*

Each of the shutters —29— and —29'— is provided near its ends with diagonal slots —30— for receiving stationary pins —31—, whereby, as the shutters are moved endwise, they will be moved transversely to and from a position across their respective openings —28— and —28'—, each shutter being provided at one end with an external operating member —32— slidable endwise in a light-tight opening in the adjacent side of the case and connected by jointed members —32'— to the shutter to reciprocate the latter while the pins —31— in the slots —30— cause the shutter to move sidewise. (See Fig. 11.)

A pair of plate-supporting bars 33 are secured in a horizontal position to and between opposite sides of the case just above the lower set of levers —12— and —12'—, and near opposite ends of the case to prevent contact of the plates with said levers, thereby leaving the latter free to operate in either direction in shifting the upright follower bars —18— and —18'— backward and forward.

The front —4— of the case is provided with a vertical slot or guide-way —34— for receiving a vertically movable carrier —35— having a substantially U-shaped lower end terminating in an upstanding seat —36— in vertical alinement with the opening —28—, the thickness of the seat —36— being not greater than that of a photographic plate so that when the carrier —35— is elevated from its normal down position, the seat —36— will engage and raise the adjacent plate only of the series through the opening —28— and into the individual plate-holder —8— which is then registered with said opening in a manner presently described, the upper end of the carrier —35— being provided with a hand-piece —37— by which it may be raised and lowered.

The plate-supporting seat —36— on the lower end of the carrier —35— is normally disposed in the plane of the bars —33— so as to allow the front plate to lie closely against the front wall of the case in vertical registration with the opening —28—, in which position it is held by the engagement of the bars —18— and —18'— or with the rearmost plate of the series, the hand-piece —37— being normally disposed in substantially the same plane as the upper surface of the top —3— of the case.

The rear side of the case is provided with inner upright end rails —38— forming a rigid part of the case, in one of which the inner end of the screw —25— is journaled, as shown in Fig. 5, said rails being provided intermediate their ends with transverse apertures for receiving stop pins —39— just at the inside of the vertical plane of the opening —28'—, leaving sufficient clearance between the pins and inner face of the rear side of the case to allow the passage of a photographic plate therethrough when inserted through said opening —28'—.

These pins are spring-pressed inwardly by flat springs —40—, as shown more clearly in Fig. 9, and are provided with knobs or hand-pieces —41— by which they may be withdrawn against the action of said springs for releasing the plate which may have been inserted behind the pins and allowing such plate to be forced forwardly into engagement with the rear faces of the upright bars —18— and —18'—.

The individual plate-holder —8— is adapted to be registered edgewise vertically with either of the openings —28— or —28'— and temporarily locked in such positions by any suitable means, and for this purpose, the upper surface of the top —3— of the case is provided with lengthwise ribs —42— running along opposite sides of the corresponding openings —28— and —28'— to fit into corresponding grooves on the lower edge of the individual plate-holder —8—, as shown more clearly in Fig. 3, the lower edge of said individual plate-holder being provided with key-hole slots —44— for receiving the heads of screws —45— projecting upwardly from the upper face of the top —3— near the ends thereof and at opposite ends of the corresponding openings —28 —and —28'—, as shown in Fig. 1, so that by registering the heads of these screws with the other portions of the slots —44— and then moving the individual plate-holder laterally a slight distance, said plate-holder will be temporarily locked to the top of the case in registration with the corresponding opening —28— or —28'— according to the position of said plate holder.

This individual plate-holder is provided in its lower edge with a lengthwise slot or opening —46— communicating with the recess or chamber —9— in vertical alinement therewith so as to allow a photographic plate to be withdrawn from the case into the holder or transferred from said holder into the rear of the case.

In order that the light may be excluded from the interior of the plate-holder —8—, the lower portion thereof is provided with a shutter —47— movable to and from a position across the opening —46— and having one end thereof provided with a handle 49 extending through and to the outside of one end of the plate-holder and adapted to be held in one of these adjusted positions by a spring detent —50—, as shown more clearly in Fig. 7.

A spring detent or catch —51— is secured to the closed side of the plate-holder —8— in close proximity to the shutter —47— and normally projects across the opening —46— in the lower side of said plate-holder so as to temporarily support an unexposed plate which may be lifted from the interior of the case into the holder by means of the carrier —35— while closing the shutter.

This detent —51— is withdrawn from its holding position by the shutter —47— when the latter is opened slightly beyond its full open position.

One end of the individual plate-holder —8— is provided with a vertical slot —53— communicating with the chamber —9— for receiving the slide shutter —10— of rubber or equivalent opaque material capable of excluding light when in its closed position across the open side of the chamber —9—.

Mounted on the top of the case is a counter —62— having an index finger movable around a dial and adapted to be actuated by a rack —63— and pinion —64—, the tooth rack —63— being secured to the lever —15—, while the pinion —64— is journaled in the top of the case and connected directly to the hand of the counter, the object of which is to indicate the number of plates which have been withdrawn from the magazine for exposure and incidentally to indicate the number of exposed plates which are returned to the magazine after exposure.

In operation, after the magazine has been filled with a number of, in this instance twenty-four, unexposed photographic plates in the manner previously described and it is desired to use one of those plates in a camera, the individual plate-holder —8— is temporarily secured to the top of the case in registration with the opening —28— in the manner shown in Fig. 3, whereupon the shutters —29— and —47— are opened and the catch —51— withdrawn from its holding position by the opening of the shutter —47—, after which the carrier —35— may be raised to lift the foremost plate into the holder —8— where it is concealed from the light by the slide —10—.

As soon as the plate is raised into the holder —8— just above the catch —51—, the shutter —47— is released sufficiently to allow the catch to ride under the lower edge of said plate, thereby retaining it in the holder while the carrier —35— is being lowered to its normal position, whereupon both of the shutters —29— and —47— may be again closed and the plate-holder —8— removed and placed in the camera in the usual manner for exposing the plate by withdrawing the slide.

After the photograph has been taken the plate-holder with the exposed plate therein and shutter —10— in operative position is withdrawn from the camera and placed upon upon the top of the case in register with the opening —28— where it is temporarily held in the manner described, whereupon the shutters —47— and —29'— may be successively opened to allow the negative plate to drop through the opening —29'— into the magazine behind the pins —39—.

The shutter —29'— may then be closed to exclude light from the interior of the magazine, after which the pins —39— may be withdrawn and the magazine tilted forwardly slightly to allow said plate to gravitate to the front of the pins or in behind the bars —18— and —18'—, said pins being then returned to their normal position by the springs —40—, it being understood that immediately upon the withdrawal of an unexposed plate from the front side of the bars —18— and —18'— said bars may be drawn forwardly a distance corresponding to the space of one plate by turning the screw —25—, thus leaving sufficient room at the rear of the bars for the entrance of the exposed plate between said bars and pins —39—.

These operations of withdrawing the unexposed plates from the magazine and returning the exposed plates thereto may be repeated as often as desired or until all of the unexposed plates are withdrawn, it being understood that the magazine with the exposed plates therein may be taken to any suitable place for development of said plates without liability of exposing them to the light.

What I claim is:

1. In a device of the character described, a magazine having an outlet for unexposed plates and a separate inlet for exposed plates, in combination with a follower movable within the magazine between the inlet and outlet for separating the exposed from the unexposed plates and feeding the unexposed plates one by one into registration with the outlet, and means for adjusting said follower.

2. In combination with a magazine of sufficient size to receive a considerable number of photographic plates and provided with an opening of just sufficient size to permit the passage of a plate therethrough, an individual plate-holder operatively connected with a light-tight joint to the magazine and provided with an opening registering with the first named opening, and means for transferring a plate from the magazine into the individual plate-holder through the registering openings, said openings being provided with separately movable shutters, the individual plate-holder being provided with a catch for engaging the lower edge of the plate and temporarily holding it therein while the corresponding shutter is being closed.

3. In a photographic plate carrier and transfer device, the combination with a plate-containing magazine having a passage for the individual plates in one side thereof, of a pair of upright bars movable within the magazine for feeding the plates successively into registration with said passage, and means for adjusting said bars.

4. In a device of the character described, a magazine having separate openings in its top for the passage of exposed plates and unexposed plates therethrough, respectively, a follower within the magazine movable between said openings for separating the exposed plates from the unexposed plates and for feeding the unexposed plates successively into registration with the corresponding opening, means for adjusting the follower, and movable means for temporarily holding each exposed plate within the magazine in alinement with the adjacent opening as it is inserted through said opening and for releasing said exposed plate and allowing it to follow the follower as the latter is adjusted toward the opening for the unexposed plates.

5. In a device of the character described, the combination of a magazine having an inlet for exposed plates and an outlet for unexposed plates, separate shutters for said inlet and outlet, a pair of bars movable within the magazine between the inlet and outlet for separating the exposed plates from the unexposed plates, and means for adjusting said bars simultaneously to feed the unexposed plates successively into registration with the corresponding opening.

6. In a photographic plate-holder, a magazine of sufficient size to contain a considerable number of photographic plates and provided with an opening of just sufficient size to permit the passage of a plate therethrough, a shutter for said opening, a follower movable within the magazine for adjusting the plates so as to register one of them with the opening, means for adjusting the follower, and additional means for lifting the registering plate through said opening when the shutter is open.

7. In a photographic plate-holder, a magazine of sufficient size to contain a considerable number of plates flatwise in an upright position and provided with an opening in its top for permitting the passage of a single plate therethrough, a follower movable within the magazine for adjusting the plates to register one of them with the opening, means adjusting the follower, an individual plate-halder fitted with a light-tight joint upon the top of the magazine around the opening, and means for lifting the registering plate through said opening and into the individual plate-holder.

8. In a photographic-plate holder, a magazine of sufficient size to receive a considerable number of plates and provided with separate openings, one for the exposed and the other for the unexposed plates, separate shutters for said openings, a follower within the magazine for moving the unexposed plates so as to register one of them with its opening, means for adjusting the follower and means for withdrawing the registering plate through such opening when its shutter is open, the other opening serving to receive the exposed plates when the corresponding shutter is open.

9. In a photographic plate-holder, a magazine of sufficient size to receive a considerable number of plates and provided with an opening of just sufficient size to permit the passage of a single plate therethrough, a follower within the magazine for adjusting the plates within the magazine to register one of them with said opening, means for adjusting the follower, and means for withdrawing the registering plate through said opening.

In witness whereof I have hereunto set my hand this 15th day of February, 1915.

STEPHEN A. MISCHANSKY.

Witnesses:
  H. E. CHASE,
  ALICE M. CANNON.

Copies of this patent may be obtained for five cents each, by addressing the "Commissioner of Patents, Washington, D. C."